(12) United States Patent
Dai et al.

(10) Patent No.: US 10,699,712 B2
(45) Date of Patent: Jun. 30, 2020

(54) PROCESSING METHOD AND ELECTRONIC DEVICE FOR DETERMINING LOGIC BOUNDARIES BETWEEN SPEECH INFORMATION USING INFORMATION INPUT IN A DIFFERENT COLLECTION MANNER

(71) Applicant: Lenovo (Beijing) Co., Ltd., Beijing (CN)

(72) Inventors: Haisheng Dai, Beijing (CN); Zhepeng Wang, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 0 days.

(21) Appl. No.: 14/638,281

(22) Filed: Mar. 4, 2015

(65) Prior Publication Data

US 2016/0078865 A1   Mar. 17, 2016

(30) Foreign Application Priority Data

Sep. 16, 2014   (CN) .......................... 2014 1 0472161

(51) Int. Cl.
 *G10L 15/26* (2006.01)
 *G10L 15/04* (2013.01)
 *G10L 15/24* (2013.01)

(52) U.S. Cl.
 CPC .............. *G10L 15/26* (2013.01); *G10L 15/04* (2013.01); *G10L 15/24* (2013.01)

(58) Field of Classification Search
 CPC .......... G10L 15/04; G10L 15/24; G10L 15/26
 USPC ................................................. 704/235, 248
 See application file for complete search history.

(56) References Cited

U.S. PATENT DOCUMENTS

| | | | | |
|---|---|---|---|---|
| 4,718,094 A | * | 1/1988 | Bahl ....................... | G10L 15/08 704/240 |
| 4,980,918 A | * | 12/1990 | Bahl ....................... | G10L 15/08 704/240 |
| 5,023,911 A | * | 6/1991 | Gerson ................... | G10L 15/10 704/253 |

(Continued)

FOREIGN PATENT DOCUMENTS

CA        2081188 A1 *   4/1994   ............... G06F 3/16

OTHER PUBLICATIONS

Sim, Khe Chai. "Haptic voice recognition: Augmenting speech modality with touch events for efficient speech recognition." Spoken Language Technology Workshop (SLT), 2010 IEEE. IEEE, Dec. 2010, pp. 73-78.*

(Continued)

*Primary Examiner* — James S Wozniak
(74) *Attorney, Agent, or Firm* — Brinks Gilson & Lione; John C. Freeman

(57) ABSTRACT

An information processing method and an electronic device are provided. The method includes an electronic device obtaining an input information through a second collection manner when the electronic device is in a speech collection state for obtaining speech information through a first collection manner, and determining a logic boundary position in relation to a first speech information in accordance with the input information, the first speech information is obtained by the electronic device through the first collection manner which is different from the second collection manner. An electronic device corresponding thereto is also disclosed.

6 Claims, 2 Drawing Sheets obtaining an input information collected by a second collect manner when the electronic device is in a voice collection state — 101 determining a logic boundary position corresponding to the first voice information collected in the voice collection state in accordance with the input information, such that a moment of collecting the input information is employed to be an incipient or termination moment of collecting the first voice information; wherein the first voice information is collected by the first collect manner which is different from the second collect manner, and plurality of voice information are able to be collected in accordance with the time sequence by the first collect manner, and each voice information may be converted into a character information made from a character string; the logic boundary position is an indication of a logic incipient position of the first voice information input or a logic boundary position between the first voice information and a second voice information collected by the first collect manner, and the second voice information is voice information first or last collected after or before the first voice information in accordance with the time sequence — 102

(56) References Cited

U.S. PATENT DOCUMENTS

| | | | | |
|---|---|---|---|---|
| 5,764,852 A * | 6/1998 | Williams | G10L 15/26 | 704/201 |
| 5,812,973 A * | 9/1998 | Wang | G10L 15/04 | 704/251 |
| 7,907,705 B1 * | 3/2011 | Huff | H04L 12/66 | 370/352 |
| 8,014,591 B2 * | 9/2011 | Baker | G06K 9/6262 | 382/159 |
| 8,244,533 B2 * | 8/2012 | Kiuchi | G10L 15/32 | 704/251 |
| 9,432,611 B1 * | 8/2016 | Nelson | H04L 67/12 | |
| 2001/0016815 A1 * | 8/2001 | Takahashi | G10L 15/26 | 704/235 |
| 2003/0097253 A1 * | 5/2003 | Hoi | G10L 15/22 | 704/9 |
| 2003/0220798 A1 * | 11/2003 | Schmid | G10L 15/28 | 704/276 |
| 2004/0049388 A1 * | 3/2004 | Roth | G10L 15/19 | 704/251 |
| 2004/0138881 A1 * | 7/2004 | Divay | G06F 17/2725 | 704/231 |
| 2004/0230637 A1 * | 11/2004 | Lecoueche | G10L 15/20 | 709/200 |
| 2005/0203747 A1 * | 9/2005 | Lecoeuche | G06F 17/30731 | 704/270.1 |
| 2005/0216264 A1 * | 9/2005 | Attwater | G10L 15/22 | 704/239 |
| 2007/0098145 A1 * | 5/2007 | Kirkland | H04M 1/2745 | 379/201.01 |
| 2007/0188472 A1 * | 8/2007 | Ghassabian | B41J 3/445 | 345/169 |
| 2008/0133228 A1 * | 6/2008 | Rao | G10L 15/24 | 704/231 |
| 2009/0216531 A1 * | 8/2009 | Yanagihara | G10L 15/30 | 704/235 |
| 2009/0248419 A1 * | 10/2009 | Spaulding | G10L 21/10 | 704/275 |
| 2009/0254351 A1 * | 10/2009 | Shin | G06F 3/167 | 704/275 |
| 2010/0009720 A1 * | 1/2010 | Cha | G06F 1/1624 | 455/566 |
| 2010/0070268 A1 * | 3/2010 | Sung | G10L 15/24 | 704/203 |
| 2010/0105364 A1 * | 4/2010 | Yang | G06F 17/30663 | 455/414.1 |
| 2010/0121637 A1 * | 5/2010 | Roy | G10L 15/22 | 704/235 |
| 2011/0074693 A1 * | 3/2011 | Ranford | G01C 21/3608 | 345/173 |
| 2011/0246190 A1 * | 10/2011 | Suzuki | G10L 15/22 | 704/226 |
| 2012/0136661 A1 * | 5/2012 | Fu | G10L 15/187 | 704/254 |
| 2012/0179465 A1 * | 7/2012 | Cox | H04L 12/1822 | 704/235 |
| 2012/0210233 A1 * | 8/2012 | Davis | G06Q 30/0201 | 715/727 |
| 2012/0284015 A1 * | 11/2012 | Drewes | G06F 17/2818 | 704/3 |
| 2013/0054248 A1 * | 2/2013 | Ohno | G06F 3/017 | 704/275 |
| 2013/0218339 A1 * | 8/2013 | Maisonnier | B25J 11/0005 | 700/257 |
| 2014/0142937 A1 * | 5/2014 | Powledge | G06F 3/017 | 704/235 |
| 2014/0222430 A1 * | 8/2014 | Rao | G10L 15/04 | 704/254 |
| 2014/0372117 A1 * | 12/2014 | Nakata | G10L 15/26 | 704/235 |
| 2015/0032457 A1 * | 1/2015 | Koo | G06F 3/167 | 704/275 |
| 2015/0081291 A1 * | 3/2015 | Jeon | G06F 3/167 | 704/235 |
| 2015/0134320 A1 * | 5/2015 | Rangarajanidhar Sridhar | G06F 17/2775 | 704/2 |
| 2015/0134322 A1 * | 5/2015 | Cuthbert | G06F 17/289 | 704/3 |
| 2015/0317979 A1 * | 11/2015 | Yang | G10L 17/22 | 704/235 |
| 2015/0348550 A1 * | 12/2015 | Zhang | G06F 3/167 | 704/235 |
| 2016/0070441 A1 * | 3/2016 | Paek | G06F 3/04842 | 715/773 |
| 2016/0124706 A1 * | 5/2016 | Vasilieff | G06F 3/167 | 704/275 |

OTHER PUBLICATIONS

Ban, Hiromitsu, et al. "Speech recognition using synchronization between speech and finger tapping." Interspeech. Oct. 2004, pp. 1-4.*

First Office Action dated Dec. 29, 2016 (11 pages including English translation) out of Chinese priority Application No. 201410472161.0.

Second Office Action (12 pages including English translation) dated Aug. 21, 2017 from Chinese priority Application No. 201410472161.0.

Third Office Action (13 pages including English translation) dated Apr. 16, 2018 from Chinese priority Application No. 201410472161.0.

* cited by examiner

PROCESSING METHOD AND ELECTRONIC DEVICE FOR DETERMINING LOGIC BOUNDARIES BETWEEN SPEECH INFORMATION USING INFORMATION INPUT IN A DIFFERENT COLLECTION MANNER

This application claims priority to Chinese patent application No. CN 201410472161.0 filed on Sep. 16, 2014, the entire contents of which is incorporated herein by reference.

The disclosure is related to the field of computer technology, and particularly to an information processing method and electronic device.

BACKGROUND

As science and technology from which various conveniences enjoyed by people are presented are developed persistently, the electronic technology is also getting a rapid development, and the categories of the electronic products are more and more fruitful as well. People can enjoy a comfortable life due to the development of science and technology through various categories of electronic devices now. For example, the electronic device, such as a mobile phone and the like, has become the indispensable article in the daily life, and people can enhance a social networking with others in a manner in which a phone call is made or a text message is sent out.

In the related art, the speech input manner is more natural and efficient and is used more universally. The speech input manner itself, however, is incomplete. A user often inputs a plurality of sentences in the manner of speech input, and a position at which the halt time by the user is longer would be considered generally as the intersection between two of a plurality of sentences by the electronic device. The user, however, would also halt midway when speaking one sentence due to the factors such as a possible incomplete consideration and the like; the last sentence input by the user would be regarded to be complete by the electronic device if the halt time is long, such that the content itself in which only one sentence is included is divided into two or more sentences; as such, it is possible that an error of the original connotation of the one sentence occurs, since the one sentence is divided up after the content of the speech input is recognized, causing a misunderstanding of the original intention.

It can be seen that the effect of the recognition on the speech by the speech input manner is awful, and an error of the semantics possibly occurs.

SUMMARY

According to the embodiments of present disclosure, an information processing method is provided, the method includes: an electronic device obtaining an input information through a second collection manner, when the electronic device is in a speech collection state for obtaining speech information through a first collection manner; the electronic device determining a logic boundary position in relation to a first speech information in accordance with the input information, the first speech information is obtained by the electronic device through the first collection manner which is different from the second collection manner.

Alternatively, the logic boundary position is an indication of a logic starting position of the first speech information, or a logic dividing position between the first speech information and a second speech information, the second speech information is speech information first obtained following the first speech information, or last obtained prior to the first speech information.

Alternatively, if the second speech information is speech information first obtained following the first speech information, the method includes: the electronic device performing speech recognition on the first speech information after determining the logic boundary position to convert the first speech information into first character information.

Alternatively, the electronic device determining a display position corresponding to the input information in an edition interface, the edition interface is an input display interface with respect to the first and second collection manners; and displaying the first character information in the edition interface starting from the display position corresponding to the input information.

Alternatively, the method further includes: converting the input information into a second character information; and combining the first character information and the second character information into a third character information based on the logic boundary position.

Alternatively, the method further includes: the electronic device displaying the third character information in the edition interface, the first character information is located before the second character information when the third character information is displayed, the second character information is displayed in the edition interface starting from the display position corresponding to the input information.

Alternatively, if the second speech information is speech information last obtained prior to the first speech information, the method includes: the electronic device generating an instruction in accordance with the logic boundary position, and executing the instruction to process speech information obtained.

Alternatively, the electronic device generating a speech collection instruction in accordance with the logic boundary position, and executing the speech collection instruction to determine a speech collection function is enabled from the logic boundary position, in order to collect the first speech information.

Alternatively, before the input information is obtained or before the logic boundary position in relation to the first speech information is determined in accordance with the input information, the electronic device obtaining the first speech information through the first collection manner.

Alternatively, if the input information has not been obtained within a first period after the first speech information is obtained by the electronic device, then the electronic device process the first speech information after the first period; if the input information has been obtained within a second period after the first speech information is obtained, and the second period is shorter than the first period, then the electronic device processing the first speech information upon the input information is obtained.

According to the embodiments of present disclosure, an electronic device is provided, which includes: an acquisition module for obtaining an input information through a second collection manner when the electronic device is in a speech collection state for obtaining speech information through a first collection manner; and a processor for determining a logic boundary position in relation to the first speech information in accordance with the input information; the first speech information is obtained through the first collection manner which is different from the second collection manner.

Alternatively, the logic boundary position is an indication of a logic starting position of the first speech information input, or a logic dividing position between the first speech information and a second speech information, the second speech information is speech information first obtained following the first speech information, or last obtained prior to the first speech information.

Alternatively, the processor is configured to perform recognition on the first speech information after determining the logic boundary position to convert the first speech information into a first character information.

Alternatively, the processor is configured to determine a display position corresponding to the input information in an edition interface; and display the first character information starting from the display position; the edition interface is an input display interface with respect to the first and second collection manners.

Alternatively, the processor is configured to convert the input information into a second character information; and combine the first character information and the second character information into a third character information based on the logic boundary position.

Alternatively, the processor is configured to display the third character information in the edition interface, the first character information is located before the second character information, the second character information is displayed starting from the display position corresponding to the input information.

Alternatively, if the second speech information is speech information last obtained prior to the first speech information, the processor is configured to generate an instruction in accordance with the logic boundary position; and execute the instruction to process speech information obtained.

Alternatively, the processor is configured to generate a speech collection instruction in accordance with the logic boundary position; and execute the speech collection instruction to determine a speech collection function is enabled from the logic boundary position, in order to collect the first speech information.

Alternatively, the processor is further configured to obtain the first speech information through the first collection manner before the input information is obtained or the logic boundary position corresponding to the first speech information is determined in accordance with the input information.

Alternatively, if the input information is not obtained within a first period after the first speech information is obtained, the processor is configured to process the first speech information after the first period; if the input information is obtained within a second period after the first speech information is obtained, and the second period is shorter than the first period, the processor is configured to process the first speech information upon the input information is obtained.

DETAILED DESCRIPTION

Figure 1:
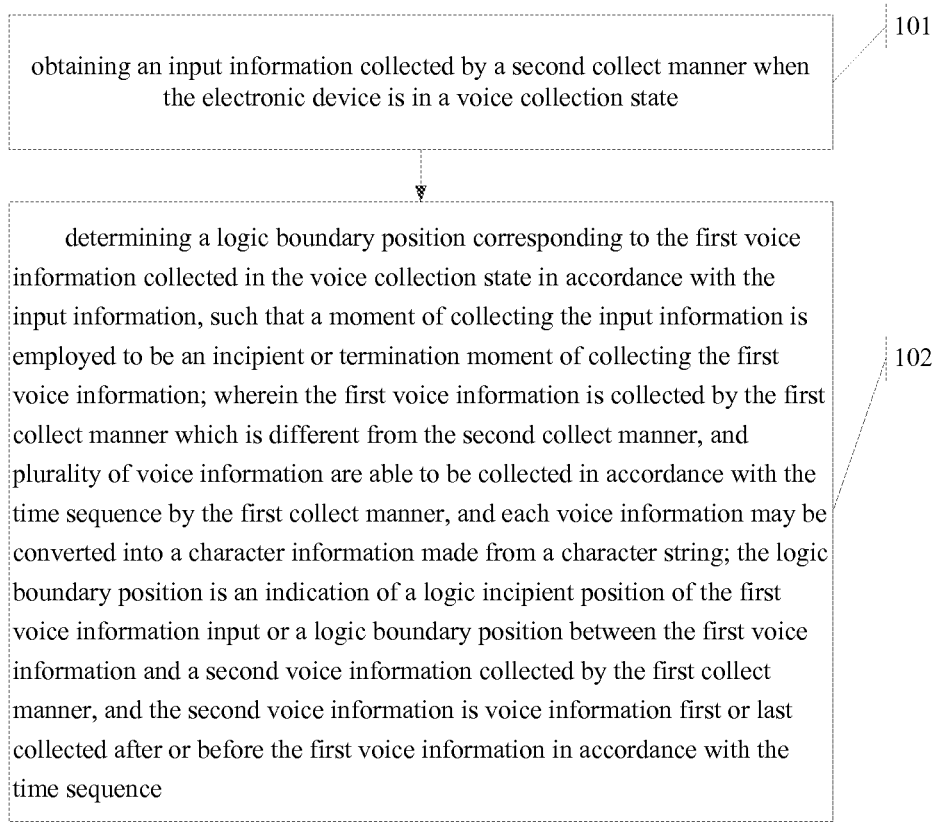
FIG. 1 is a primary flowchart of an information processing method in the embodiment of the disclosure.

In the embodiment of the disclosure, there is provided an information processing method which may be applied to an electronic device, the method may comprise the steps of: obtaining an input information collected by a second collection manner when the electronic device is in a speech collection state; determining a logic boundary position corresponding to the first speech information collected in the speech collection state in accordance with the input information, such that a moment at which the input information is collected is employed to be a starting or termination moment of collecting the first speech information; wherein the first speech information is collected by a first collection manner which is different from the second collection manner, and a plurality of speech information, each of which is able to be converted into a character information made from one or more character strings, is capable of being collected by the first collection manner in accordance with the time sequence; the logic boundary position is an indication of a logic starting position of the first speech information input or a logic division position between the first speech information and a second speech information collected by the first collection manner, and the second speech information is the first or last speech information collected after or before the first speech information in accordance with the time sequence.

In the embodiment of the disclosure, the speech information may be collected by a first collection manner when the electronic device is in the speech collection state, and meanwhile, the electronic device may also collect the input information by a second collection manner and determine the logic boundary position corresponding to the collected first speech information in accordance with the input information; as such, the electronic device will determine the logic boundary point of the speech information input by the user in accordance with additional input information; when the user is speaking one sentence, the electronic device will not regard the previous sentence input by the user is completed even though the midway halt time is long, but wait all the times and determine the boundary point between the speech inputs by the user in accordance with input information till the input information is received, such that the case where the content which is one sentence itself is divided into two or even more sentences is avoided, preventing the semantics parsed upon the parse of the speech from being an error as much as possible; it is advantageous for the user to understand the original connotation correctly, improving the accuracy of the semantics recognition.

The object, technical solution, and advantages of the embodiment of the disclosure will be more appreciated from the clear and thorough description of the technical solution in the embodiment of the disclosure in conjunction with the drawings thereof hereinafter; it is obvious that the depicted embodiment is a part but not all of the embodiments of the disclosure. All of the other embodiments achieved on the premise that there is not any inventive work is made by those skilled in the art pertains to the protective scope of the disclosure based on the embodiment in the disclosure.

In the embodiment of the disclosure, the electronic device may be, for example, a mobile phone, a tablet (PAD), a personal computer (PC), a laptop, a video camera, a smart TV, or may be, for example, a dedicated recording device and the like, and the disclosure is not limited thereto.

In addition, in the context, the term "and/or" is only an association relationship describing the associated objects, representing there may be three relationships, for example, "A and/or B" may represents three cases where there is only A, there is A and B simultaneously, and there is only B. Further, in the context, the character "/" generally means an "or" relationship between the previous and next associated objects, unless stated otherwise.

A detailed description will be made on the preferred implementations of the disclosure in conjunction with the drawings hereinafter.

With reference to FIG. 1, in the embodiment of the disclosure, there is provided an information processing method which may be applied to an electronic device, and the primary flow of the method is described as follows.

Step 101: obtaining input information collected by a second collection manner when the electronic device is in a speech collection state.

The electronic device is able to collect speech information when it is in the speech collection state. In particular, the electronic device may have an audio input unit, such as a microphone, by which the electronic device may collect speech information.

The manner in which the speech information is collected by the electronic device is a manner in which the collection is made by the first collection manner which, for example, is a speech collection manner.

The electronic device may obtain the input information collected by the second collection manner which is, for example, a mouse input manner, or a keyboard input manner, or a writing pad input manner, or a gesture input manner, etc., as long as the second collection manner is different from the first collection manner, and the second collection manner of the disclosure is not limited thereto.

Step 102: determining a logic boundary position corresponding to the first speech information collected in the speech collection state in accordance with the input information, such that a moment at which the first speech information is collected is employed to be a starting or termination moment of collecting the first speech information; wherein the first speech information is collected by a first collection manner which is different from the second collection manner, and a plurality of speech information, each of which is able to be converted into a character information made from one or more character strings, is capable of being collected by the first collection manner in accordance with the time sequence; the logic boundary position is an indication of a logic starting position of the first speech information input or a logic dividing position between the first speech information and a second speech information collected by the first collection manner, and the second speech information is the first or last speech information collected after or before the first speech information in accordance with the time sequence.

Alternatively, in the embodiment of the disclosure, the method further comprises the step of: before the input information collected by the second collection manner is obtained or the logic boundary position corresponding to the first speech information collected in the speech collection state is determined in accordance with the input information, collecting the first speech information by the first collection manner.

The logic boundary position of the first speech information may be determined in accordance with the input information. For example, if a user desires to input a paragraph and the first speech information is the first sentence input by the user, the logic boundary position may be an indication of the logic starting position of the first speech information input; if a user desires to input a paragraph and the first speech information is one sentence but not the first sentence of the paragraph input by the user, the logic boundary position may be an indication of the logic dividing position between the first speech information and the second speech information, and the second speech information may be the last speech information collected before the first speech information in accordance with the time sequence, or may also be the first speech information collected after the first speech information in accordance with the time sequence. That is, generally speaking, the logic boundary position may be the indication of the upper or lower boundary of the first speech information.

It is to be understood that the logic boundary position of the first speech information is determined after the input information is received by the electronic device which gets to determine the boundary of the first speech information; a complete semantics of the first speech information may be determined and recognized in accordance with the logic boundary position of the first speech information if the first speech information is to be recognized, such that the boundary of the speech will not be determined simply in accordance with the halt time of the user, making the result of the obtained logic boundary more accurate, which is advantageous for a recovery of the original intention of the user.

In the embodiment of the disclosure, after the speech information is obtained, the speech information may be converted into character information for processing, or a corresponding instruction may be generated in accordance with the determined logic boundary position. The two operations above will be described respectively hereinafter.

1. Conversion from Speech Information to Character Information for Processing.

Alternatively, in the embodiment of the disclosure, if the logic boundary position is the indication of the logic starting position of the first speech information input or the logic dividing position between the first speech information and the second speech information, and the second speech information is the first speech information collected after the first speech information in accordance with the time sequence, the method may further comprise the step of: after the logic boundary position corresponding to the first speech information collected in the speech collection state, conducting a speech recognition on the first speech information to convert the first speech information into a first character information.

That is, the speech recognition may be conducted on the first speech information after the logic boundary position of the first speech information is determined, such that the first speech information is converted into a character information, for example, the character information may be referred to be as the first character information which represents the semantics of the first speech information.

In that case, if the logic boundary position is the indication of the logic starting position of the first speech information input, after the input information collected by the second collection manner is obtained, the method may further comprise the step of: determining a display position corresponding to the input information in a edition interface; wherein the edition interface is an input display interface with respect to the first and second collection manners;

After speech recognition is conducted on the first speech information, such that the first speech information is converted into the first character information, the method may further comprise the step of: displaying the first character information in the edition interface starting from a first display position; wherein the first display position is a display position corresponding to the input information in the edition interface.

At that time, the input of the input information by the user is intended to locate a position at which the input speech information is displayed on the page.

For example, one scenario is that the edition interface is a word document interface, and the user desires to input the speech information by the speech input manner, then the electronic device collects the speech information input by the user by the first collection manner. The input information is input by the second collection manner through the user before the speech information is input. For example, if a display unit of the electronic device is a touch display unit, and the second collection manner is a touch input manner, a position in the word document interface displayed in the display unit is touched by the finger(s) of the user, and the position is a display position corresponding to the input information in the edition interface, for example, the display position is referred to be as the first display position. Thereafter, a speech information is started to be input by the user, for example, the first input speech information is the first speech information, the first speech information herein may be an indication of a first sentence in the entire content that the user desires to output, then the first speech information may be converted into a character information by the electronic device, and the character information is, for example, referred to be as the first character information and displayed starting from the first display position.

Figure 2:
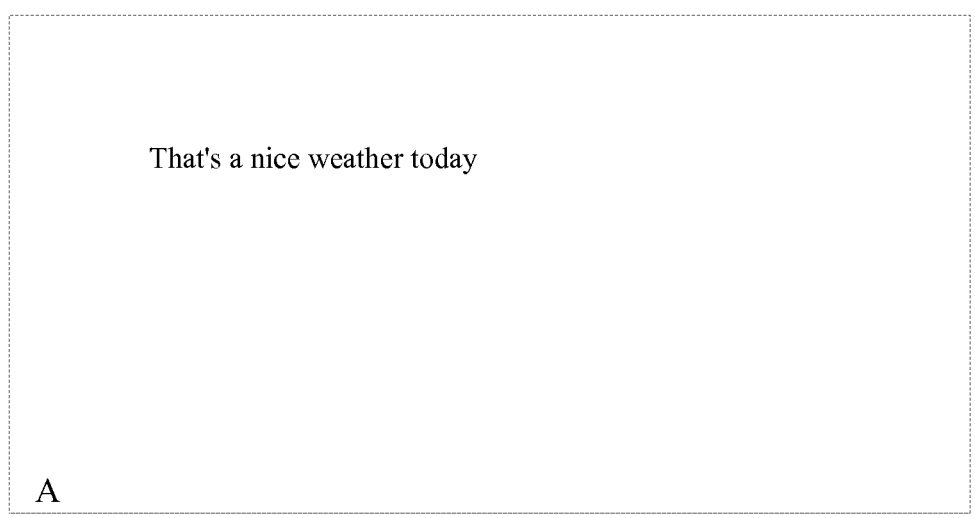
FIG. 2 is a schematic diagram of the display of the first character information in the embodiment of the disclosure.

With reference to FIG. 2 in which the character A represents the edition interface, such as the above-described word document interface in which the first display position, i.e., the position shown by the vertical line in FIG. 2, is touched by the finger(s) of the user. It is to be noted that the vertical line is not possibly displayed in an actual display, and the explanation by the vertical line is only intended to express the first display position. The text portion in FIG. 2 is the first character information obtained through the conversion of the first speech information. It can be seen that the first character information is displayed from the first display position.

That is, the position in which the speech information is input is determined by inputting the input information firstly when the user desires to input the speech information, and the electronic device can display the input speech information in accordance with the display position corresponding to the input information, such that the character information converted from the speech information is able to be displayed on a position considered to be appropriate by the user, making the result of the display more compliant with the requirement of the user.

Alternatively, in the embodiment of the disclosure, if the logic boundary position is the indication of the logic dividing position between the first speech information and second speech information, and the second speech information is speech information first collected after the first speech information in accordance with the time sequence, then after the logic boundary position corresponding to the first speech information collected in the speech collection state is determined in accordance with the input information, in addition to converting the first speech information into the first character information, the method further comprises the step of:

conducting a recognition on the input information, such that the input information is converted into a second character information;

combining the first character information and second character information into a third character information by the logic boundary position.

That is, each of the first speech information and the input information can be converted into the character information, and the first character information and the second character information are combined together. For example, the first character information is text information, the second character information is punctuation information, and the second speech information is the speech information first collected after the first speech information in accordance with the time sequence, then the second character information should be added to the end of the first character information, meaning that a punctuation mark is added at the lower boundary of the first character information. For text information, it is common that a logic division is conducted by the punctuation mark, therefore, the addition of the punctuation mark to the lower boundary of the first character information means a logic division is conducted on the first character information and the character information resulting from the speech information conversion input thereafter.

Alternatively, after the input information collected by the second collection manner is obtained, in the embodiment of the disclosure, the method may further comprise the step of: determining a display position corresponding to the input information in the edition interface; wherein the edition interface is an input display interface with respect to the first and second collection manners;

After the first character information and second character information are combined into the third character information by the logic boundary position, the method further comprises the step of: displaying the third character information in the edition interface, and the first character information is located before the second character information when the third character information is displayed; wherein the second character information is displayed in the edition interface starting from a first display position which is a display position corresponding to the input information in the edition interface.

That is, the third character information may be displayed in the edition interface after the first character information and second character information are combined into the third character information. A formation of the third character information by the addition of the second character information to the end of the first character information is described above; therefore, the first character information is displayed before the second character information when the third character information is displayed.

The display position may be determined when the third character information is displayed. One manner is to determine the display position corresponding to the input information in the edition interface. For example, the display position is referred to be as the first display position.

For example, one scenario is that the edition interface is a word document interface, and the user desires to input the speech information by the speech input manner, then the electronic device collects the speech information input by the user by the first collection manner. The input information is input by the second collection manner through the user after the first speech information is input, for example, if a display unit of the electronic device is a touch display unit, and the second collection manner is a touch input manner, a position in the word document interface displayed in the display unit is touched by the finger(s) of the user, and the position is a display position corresponding to the input information in the edition interface, i.e., the first display position. The electronic device converts the first speech information into the first character information, and adds the second character information to the end of the first character information after the input information is converted into the second character information, and combines the first speech information and the second character information into the third character information. The second character information is displayed starting from the first display position when the third character information is displayed by the electronic device.

Figure 3:
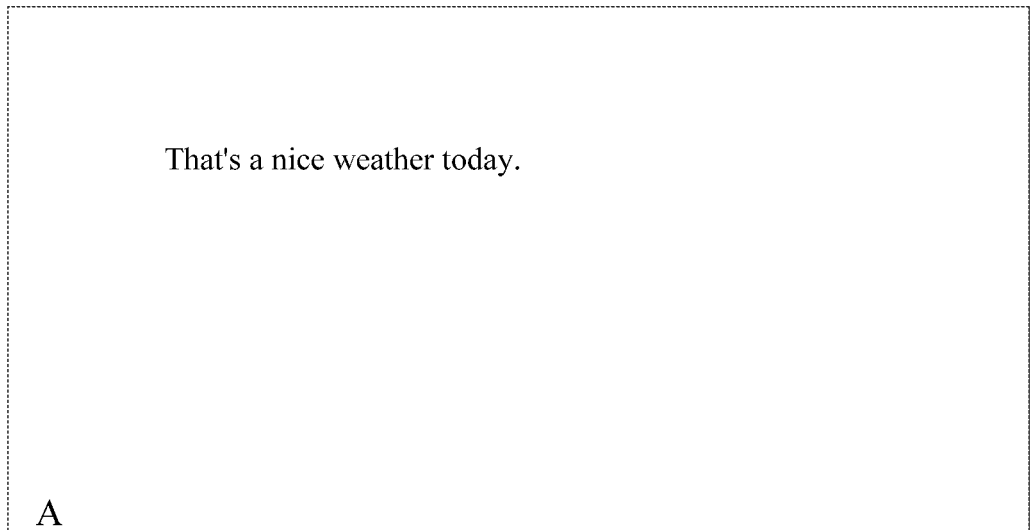
FIG. 3 is a schematic diagram of the display of the third character information in the embodiment of the disclosure.

With reference to FIG. 3 in which the A represents the edition interface, for example, the edition interface is the word document interface as described above. The text portion in FIG. 3 is the first character information obtained through the conversion of the first speech information. A punctuation mark, i.e., the full stop illustrated in FIG. 3, is input through the keyboard input manner by the user after the first speech information is input, and the display position at which the full stop in FIG. 3 is located is the first display position. The text portion and the punctuation mark in FIG. 3 are combined into the third character information, and it can be seen that the punctuation mark is in the end of the text portion, and the position at which the punctuation mark is located is the first display position.

It means that the first display position in the display unit is touched by the finger(s) of the user after one sentence is input, showing that the punctuation mark is to be displayed at the first display position, such that the display position of the third character information is determined accordingly. The electronic device may display the input speech information in accordance with the display position corresponding to the input information, such that the character information converted from the speech information may be displayed at a position considered to be appropriate by the user, making the result of the display more compliant with the user requirement.

2. Generation of Corresponding Instruction in Accordance with the Determined Logic Boundary Position.

Alternatively, if the logic boundary position is an indication of a logic starting position of the first speech information input or a logic dividing position between the first speech information and the second speech information, and the second speech information is the last speech information collected before the first speech information in accordance with the time sequence, then after the logic boundary position corresponding to the first speech information collected in the speech collection state is determined in accordance with the input information, in the embodiment of the disclosure, the method may further comprise the step of:

generating a certain instruction in accordance with the logic boundary position;

performing the certain instruction to conduct a corresponding processing on the input speech information.

Alternatively, in the embodiment of the disclosure, the generating the certain instruction in accordance with the logic boundary position may comprise the step of: generating a speech collection instruction in accordance with the logic boundary position;

performing the certain instruction to conduct the corresponding processing on the input speech information comprises the step of: performing the speech collection instruction to determine a speech collection function is enabled from the logic boundary position, in order to collect the input speech information.

It means that the input information is input by the user, and the speech collection function is determined to be enabled by the electronic device to start the speech collection after the input information is collected. In the embodiment of the disclosure, there is not any conflict between the enabling of the speech collection function and the staying in the speech collection state, and the staying in the speech collection state does not mean that the speech collection function is enabled necessarily; the speech collection function may be enabled upon or after the electronic device is in the speech collection state, and may be enabled by the electronic device automatically or by user manually.

For example, one scenario is that the user inputs the first speech information by the speech input manner and inputs the input information by the keyboard input manner, and the electronic device determines the logic boundary position of the first speech information in accordance with the input information, generates the speech collection instruction in accordance with the logic boundary position, and determines to start to enable the speech collection function from the logic boundary position, so as to collect the input speech information.

Alternatively, in the embodiment of the disclosure, before the input information collected by the second collection manner is obtained or the logic boundary position corresponding to the first speech information collected in the speech collection state is determined in accordance with the input information, the method may further comprise the step of: collecting the first speech information by the first collection manner.

Alternatively, in the embodiment of the disclosure, if the first speech information is collected by the first collection manner before the input information collected by the second collection manner is obtained, then after the first speech information is collected by the first collection manner, the method may further comprise the step of: conducting a certain processing on the first speech information if the input information has not been collected for a first period, wherein an starting moment of the first period is a termination moment of collecting the first speech information.

That is, the certain processing may be started to be conducted on the first speech information when the input information has not been collected by the electronic device for the first period since the termination moment of collecting the first speech information, and the certain processing may be, for example, a recognition on the first speech information or other processing, and the disclosure is not limited thereto.

Additionally or alternatively, in the embodiment of the disclosure, if the first speech information is collected by the first collection manner before the input information collected by second collection manner is obtained, then obtaining the input information collected by the second collection manner may comprise the step of: obtaining the input information collected by the second collection manner upon an elapse of a second period; wherein a starting moment of the second period is a termination moment of collecting the first speech information, the second period being shorter than the first period;

After the input information collected by the second collection manner is obtained, the method further comprises the step of: conducting the certain processing on the first speech information.

That is, the electronic device has collected the input information upon an elapse of a second period since the termination moment of collecting the first speech information, then the electronic device may start immediately to conduct the certain processing on the first speech information, wherein the second period being shorter than the first period.

The first period is, for example, a preset period, and the electronic device may start to process the first speech information if there is not any other input by the user when the first period is elapsed. It can be seen that the certain processing may be started to be conducted on the first speech information immediately after the input information is collected by the electronic device by employing the technical solution in the embodiment of the disclosure, and it is not necessary to conduct processing until the first period is elapsed, saving the operation time and improving the operation efficiency in comparison with the related art.

Figure 4:
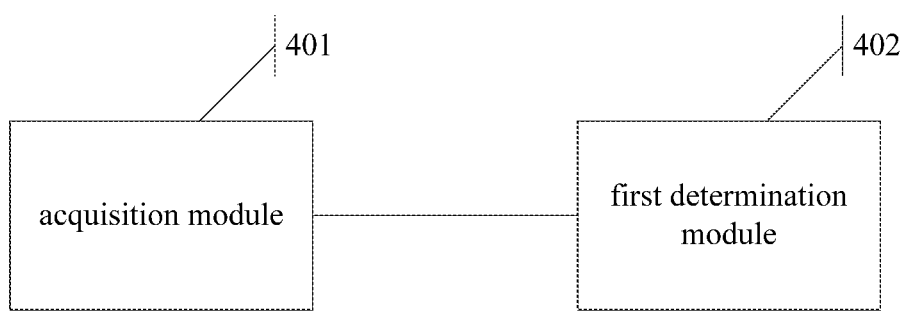
FIG. 4 is a block diagram of a primary structure of an electronic device in the embodiment of the disclosure.

With reference to FIG. 4, in the embodiment of the disclosure, there is provided an electronic device comprising an acquisition module 401 and a first determination module 402 based on the same inventive concept.

The acquisition module 401 is configured for obtaining the input information collected by second collection manner when the electronic device is in the speech collection state.

The first determination module 402 is configured for determining the logic boundary position corresponding to first speech information collected in the speech collection state in accordance with the input information, such that the moment of collecting the input information is employed to be a starting or termination moment of collecting the first speech information.

Wherein the first speech information is collect by a first collection manner which is different from the second collection manner, and a plurality of speech information, each of which is able to be converted into a character information made from one or more character strings, is capable of being collected by the first collection manner in accordance with the time sequence; the logic boundary position is an indication of a logic starting position of the first speech information input or a logic dividing position between the first speech information and a second speech information collected by the first collection manner, and the second speech information is the first or last speech information collected after or before the first speech information in accordance with the time sequence.

Alternatively, in the embodiment of the disclosure, the electronic device further comprises a recognition module. If the logic boundary position is an indication of a logic starting position of the first speech information input or a logic dividing position between the first speech information and second speech information, and the second speech information is the speech information first collected after the first speech information in accordance with the time sequence, the recognition module is configured for: conducting a speech recognition on the first speech information to convert the first speech information into a first character information.

Alternatively, in the embodiment of the disclosure, the electronic device further comprises a second determination module and an operation module;

if the logic boundary position is the indication of the logic starting position of the first speech information input, the second determination module is configured for determining a display position corresponding to the input information in the edition interface after the input information collected by the second collection manner is obtained by the acquisition module 401; wherein the edition interface is an input display interface with respect to the first and second collection manners;

the operation module is configured for displaying a first character information in the edition interface starting from the first display position after a speech recognition is conducted on the first speech information by the recognition module to convert the first speech information into the first character information; wherein the first display position is a display position corresponding to the input information in the edition interface.

Alternatively, in the embodiment of the disclosure, the electronic device further comprises a combination module;

if the logic boundary position is the indication of the logic dividing position between the first speech information and second speech information, and the second speech information is speech information first collected after the first speech information in accordance with the time sequence, the recognition module is further configured for conducting a recognition on the input information after the logic boundary position corresponding to the first speech information collected in the speech collection state is determined in accordance with the input information by the first determination module 402, such that the input information is converted into a second character information;

the combination module is configured for combining the first character information and second character information into a third character information by the logic boundary position.

Alternatively, in the embodiment of the disclosure, the electronic device further comprises the second determination module and the operation module;

the second determination module is configured for determining a display position corresponding to the input information in the edition interface after the input information collected by the second collection manner is obtained by the acquisition module 401; wherein the edition interface is an input display interface with respect to the first and second collection manners;

the operation module is configured for displaying a third character information in the edition interface after the first character information and the second character information are combined into the third character information by the logic boundary position by means of the combination module, and the first character information is located before the second character information when the third character information is displayed; wherein the second character information is displayed in the edition interface starting from a first display position which is a display position corresponding to the input information in the edition interface.

Alternatively, in the embodiment of the disclosure, the electronic device further comprises a generation module and a performing module; if the logic boundary position is the indication of the logic starting position of the first speech information input or the logic dividing position between the first speech information and the second speech information, and the second speech information is the last speech information collected before the first speech information in accordance with the time sequence, then the generation module is configured for generating a certain instruction in accordance with the logic boundary position after the logic boundary position corresponding to the first speech information collected in the speech collection state is determined in accordance with the input information by the first determination module 402;

the performing module is configured for performing the certain instruction to conduct a corresponding processing on the input speech information.

Alternatively, in the embodiment of the disclosure, the generation module is configured particularly for generating a speech collection instruction in accordance with the logic boundary position; the performing module is configured particularly for performing the speech collection instruction to determine a speech collection function is enabled from the logic boundary position, in order to collect the input speech information.

Alternatively, in the embodiment of the disclosure, the acquisition module 401 is further configured for collecting the first speech information by the first collection manner before the input information collected by the second collection manner is obtained by the acquisition module 401 or the logic boundary position corresponding to the first speech information collected in the speech collection state is determined in accordance with the input information by the first determination module 402.

Alternatively, in the embodiment of the disclosure, the electronic device further comprises a processing module; if the first speech information is collected by the first collection manner before the input information collected by second collection manner is obtained, then the processing module is configured for conducting the certain processing on the first speech information if the input information has not been collected for the first period after the first speech information is collected by the first collection manner by means of the acquisition module 401, wherein the starting moment of the first period is the termination moment of collecting the first speech information; or the acquisition module 401 is employed to obtain the input information collected by the second collection manner by the steps of: obtaining the input information collected by the second collection manner upon an elapse of a second period; wherein a starting moment of the second period is a termination moment of collecting the first speech information, the second period being shorter than the first period; the processing module is configured for conducting the certain processing on the first speech information after the input information collected by the second collection manner is obtained by the acquisition module 401.

The acquisition module 401, the first determination module 402, the second determination module, the operation module, the combination module, the recognition module, the generation module, the performing module, and the processing module may be connected with each other. It should be appreciated that the first determination module 402, the second determination module, the operation module, the combination module, the recognition module, the generation module, the performing module, and the processing module may constitute one or more processors.

In the embodiment of the disclosure, the speech information may be collected by a first collection manner when the electronic device is in the speech collection state, and meanwhile, the electronic device may also collect the input information by a second collection manner and determine the logic boundary position corresponding to the collected first speech information in accordance with the input information; as such, the electronic device will determine the logic boundary point of the speech information input by the user in accordance with additional input information; when the user is speaking one sentence, the electronic device will not regard the previous sentence input by the user is completed even though the midway halt time is long, but wait all the times and determine the boundary point between the speech inputs by the user in accordance with input information till the input information is received, such that the case where the content which is one sentence itself is divided into even two or more sentences is avoided, preventing the semantics parsed upon the parse of the speech from being an error as much as possible; it is advantageous for the user to understand the original connotation correctly, improving the accuracy of the semantics recognition.

In the embodiment of the disclosure, the speech information may be collected by a first collection manner when the electronic device is in the speech collection state, and meanwhile, the electronic device may also collect the input information by a second collection manner and determine the logic boundary position corresponding to the collected first speech information in accordance with the input information; as such, the electronic device will determine the logic boundary point of the speech information input by the user in accordance with additional input information; when the user is speaking one sentence, the electronic device will not regard the previous sentence input by the user is completed even though the midway halt time is long, but wait all the times and determine the boundary point between the speechspeech input by the user in accordance with input information till the input information is received, such that the case where the content which is one sentence itself is divided into even two or more sentences is avoided, preventing the semantics parsed upon the parse of the speech from being an error as much as possible; it is advantageous for the user to understand the original connotation correctly, improving the accuracy of the semantics recognition.

It is understood clearly by those skilled in the art that the division of the function modules as described above are exemplified for illustration for a convenient and simple description; in practice, the above function s may be assigned to be implemented by different function modules as needed, that is, the internal structure of the apparatus is divided into different function modules to implement all or part of the functions as described above. The specific operation procedure of the system, the apparatus, and the unit as described above may be referred to the corresponding procedure in the embodiment of the above method, and the description thereof is omitted herein.

It is to be understood that the disclosed system, apparatus, and method may be implemented by other manners in several embodiments provided in the application. For example, the apparatus as described above is simply illustrative, for example, the division of the module or unit is simply a logic function division; in practice, there is other divisions, for example, a plurality of units or components may be combined or integrated into another system, or some features may be omitted or not to be performed. In addition, the coupling or direct coupling or communication connection with each other as illustrated or discussed may be through some interfaces, a direct coupling or communication connection between the apparatuses or units, and may be electrical, mechanical or other forms.

The unit illustrated as a separate element may or may not be separated physically, and the elements shown as the unit may or may not be a physical unit, i.e., may be resident on a location or distributed over a plurality of network units. The intention of the solution of the embodiment may be achieved by selecting part or all of the units therein as practical needed.

Furthermore, the function units in various embodiments of the application may be integrated into a processing unit, and it is also possible that various units are individually present physically or two or more units are integrated into a unit. The integrated unit as described above may be implemented by a form of hardware or software function unit.

The integrated unit may be stored in a computer readable storage medium if it is implemented by a form of a software function unit and sold or used as an individual product. On the basis of such concept, the substance or contribution to the related art by the technical solution of the application or all or part of the technical solution may be embodied in the form of the software product stored in a storage medium comprising several instructions for causing a computer device, which may be a personal computer, a server, or a network device, etc., or a processor to perform all or part of the steps of the method in various embodiments in the application. The above storage medium comprises various medium which may store the program codes, such as a USB disk, a mobile hard disk, a Read-Only Memory (ROM), a Random Access Memory (RAM), a magnetic disk, or an optical disk, etc.

Specifically, the computer program instructions corresponding to the information processing method in the embodiments of the application may be stored on the storage medium, such as the optical disk, the hard disk, and the USB disk, etc., when the computer program instructions corresponding to the information processing method in the storage medium is read or performed by an electronic device, comprising the steps of:

obtaining an input information collected by a second collection manner when the electronic device is in a speech collection state;

determining a logic boundary position corresponding to the first speech information collected in the speech collection state in accordance with the input information, such that a moment of collecting the first speech information is employed to be a starting or termination moment of collecting the first speech information;

wherein the first speech information is collect by a first collection manner which is different from the second collection manner, and a plurality of speech information, each of which is able to be converted into a character information made from one or more character strings, is capable of being collected by the first collection manner in accordance with the time sequence; the logic boundary position is an indication of a logic starting position of the first speech information input or a logic dividing position between the first speech information and a second speech information collected by the first collection manner, and the second speech information is the first or last speech information collected after or before the first speech information in accordance with the time sequence.

Alternatively, if the logic boundary position is an indication of a logic starting position of the first speech information input or a logic dividing position between the first speech information and the second speech information, and the second speech information is the speech information first collected after the first speech information in accordance with the time sequence, then after the computer instruction stored in the storage medium corresponding to the step of determining the logic boundary position corresponding to the first speech information collected in the speech collection state in accordance with the input information is performed, the method further comprises the step of:

conducting a speech recognition on the first speech information to convert the first speech information into a first character information.

Alternatively, if the logic boundary position is the indication of the logic starting position of the first speech information input, then after the computer instruction stored in the storage medium corresponding to the step of obtaining the input information collected by the second collection manner is performed, the method further comprises the step of: determining a display position corresponding to the input information in a edition interface; wherein the edition interface is an input display interface with respect to the first and second collection manners; after the computer instruction stored in the storage medium corresponding to the step of conducting a speech recognize on the first speech information such that the first speech information is converted into a first character information is performed, the method further comprises the step of: displaying the first character information in the edition interface starting from a first display position; wherein the first display position is a display position corresponding to the input information in the edition interface.

Alternatively, if the logic boundary position is the indication of the logic dividing position between the first speech information and the second speech information, and the second speech information is the speech information first collected after the first speech information in accordance with the time sequence, then after the computer instruction stored in the storage medium corresponding to the step of determining the logic boundary position corresponding to the first speech information collected in the speech collection state in accordance with the input information is particularly performed, the method further comprises the steps of:

conducting a recognition on the input information, such that the input information is converted into a second character information;

combining the first character information and second character information into a third character information by the logic boundary position.

Alternatively, after the computer instruction stored in the storage medium corresponding to the step of obtaining the input information collected by the second collection manner is particularly performed, the method further comprises the steps of: determining a display position corresponding to the input information in a edition interface; wherein the edition interface is an input display interface with respect to the first and second collection manners; after the computer instruction stored in the storage medium corresponding to the step of combining the first character information and the second character information into a third character information by the logic boundary position is particularly performed, the method further comprises the step of: displaying the third character information in the edition interface, and the first character information is located before the second character information when the third character information is displayed; wherein the second character information is displayed in the edition interface starting from a first display position which is a display position corresponding to the input information in the edition interface.

Alternatively, if the logic boundary position is the indication of the logic starting position of the first speech information input or the logic dividing position between the first speech information and the second speech information, and the second speech information is the last speech information collected before the first speech information in accordance with the time sequence, then after the computer instruction stored in the storage medium corresponding to the step of determining the logic boundary position corresponding to the first speech information collected in the speech collection state in accordance with the input information, the method further comprises the steps of:

generating a certain instruction in accordance with the logic boundary position;

performing the certain instruction to conduct a corresponding processing on the input speech information.

Alternatively, in the procedure during which the computer instruction stored in the storage medium corresponding to the step of generating a certain instruction in accordance with the logic boundary position is particularly performed, the method particularly comprises the step of: generating a speech collection instruction in accordance with the logic boundary position; in the procedure during which the computer instruction stored in the storage medium corresponding to the step of conducting a corresponding processing on the input speech information by performing the certain instruction is particularly performed, the method particularly comprises the step of: performing the speech collection instruction to determine a speech collection function is enabled from the logic boundary position, in order to collect the input speech information.

Alternatively, before the computer instruction stored in the storage medium corresponding to the step of obtaining the input information collected by the second collection manner or determining the logic boundary position corresponding to the first speech information collected in the speech collection state in accordance with the input information is particularly performed, the method further comprises the step of:

collecting the first speech information by the first collection manner.

Alternatively, if the first speech information is collected by the first collection manner before the input information collected by the second collection manner is obtained, then after the computer instruction stored in the storage medium corresponding to the step of collecting the first speech information by the first collection manner is particularly performed, the method further comprises the step of: conducting a certain processing on the first speech information if the input information has not been collected for a first period, wherein a starting moment of the first period is a termination moment of collecting the first speech information; or in the procedure during which the computer instruction store in the storage medium corresponding to the step of obtaining the input information collected by the second collection manner is particularly performed, the method particularly comprises the step of: obtaining the input information collected by the second collection manner upon an elapse of a second period; wherein a starting moment of the second period is a termination moment of collecting the first speech information, the second period being shorter than the first period; after the computer instruction stored in the storage medium corresponding to the step of obtaining the input information collected by the second collection manner is particularly performed, the method further comprises the step of: conducting the certain processing on the first speech information.

As describe above, the embodiments above are described simply for a detailed description of the technical solution of the application; however, the illustration of the embodiments above is merely used for an aid of the understanding of the method of the disclosure, and will never be construed to any limitation of the disclosure. The variant and alternation which may be perceived readily by those skilled in the art within the technical scope of the disclosure is fallen into the protective scope of the disclosure.

The invention claimed is:

1. A non-transitory computer readable medium comprising computer executable instructions adapted to perform the processes of:

obtaining a first input information through a first non-voice collection manner that is a touch operation manner;

enabling a speech collection function in response to the first input information and obtaining a first speech information through a voice collection manner;

determining a logic starting position of the first speech information in accordance with the first input information;

obtaining a second input information through a second non-voice collection manner;

determining a logic boundary position in relation to the first speech information in accordance with the second input information, the logic boundary position is an indication of a logic dividing position between the first speech information and a second speech information, the second speech information is speech information first obtained following the first speech information through the voice collection manner, the first speech information and the second speech information are sentences in an entire content that a user desires to output;

performing speech recognition on the first speech information between the first input information and the second input information as a complete sentence after determining the logic boundary position and before obtaining the second speech information, wherein the speech recognition is performed under the assumption that the first speech information between the logic starting position and the logic boundary position has complete semantics;

converting the first speech information into a first character information;

converting the second input information into a second character information;

combining the first character information and the second character information into a third character information;

determining a touch position of the touch operation manner in an edition interface as a first display position, the first display position being for displaying the third character information corresponding to the first input information in the edition interface, wherein the edition interface is an input display interface with respect to the first non-voice collection manner and the voice collection manner; and displaying the third character information at the first display position, wherein the first character information is located before the second character information, and the first character information is displayed from a first display position, wherein if the second input information has not been obtained within a first period after the first speech information is obtained by the electronic device, then the electronic the first speech information after the first period;

if the second input information has been obtained within a second period after the first speech information is obtained, then processing the first speech information based upon obtaining the second input information, wherein the second period is shorter than the first period.

2. The non-transitory computer readable medium of claim 1, wherein the computer executable instructions are further adapted to perform the processes of:

generating an instruction in accordance with the logic boundary position; and executing the instruction to process speech information obtained.

3. The non-transitory computer readable medium of claim 2, wherein the generating the instruction in accordance with the logic boundary position comprises generating a speech collection instruction in accordance with the logic boundary position; and wherein the executing the instruction to process the speech information comprises executing the speech collection instruction to determine that a speech collection function is enabled from the logic boundary position, so as to collect the first speech information.

4. An electronic device comprising:
an input device configured to obtain a first input information through a first non-voice collection manner that is a touch operation manner;
a processor configured to enable a speech collection function in response to the first input information and to obtain a first speech information through a voice collection manner, to determine a logic starting position of the first speech information in accordance with the first input information, to obtain a second input information through a second non-voice collection manner, to determine a logic boundary position in relation to the first speech information in accordance with the second input information, the logic boundary position is an indication of a logic dividing position between the first speech information and a second speech information, the second speech information is speech information first obtained following the first speech information by the electronic device through the voice collection manner, the first speech information and the second speech information are sentences in an entire content that a user desires to output, the processor is further configured to perform speech recognition on the first speech information between the first input information and the second input information as a complete sentence after determining the logic boundary position and before obtaining the second speech information, to convert the first speech information into a first character information, to convert the second input information into a second character information, to combine the first character information and the second character information into a third character information, to determine a touch position of the touch operation manner in an edition interface as a first display position, the first display position being for displaying the third character information corresponding to the first input information in the edition interface, wherein the edition interface is an input display interface with respect to the first non-voice collection manner and the voice collection manner; to display the third character information at the first display position, wherein the first character information is located before the second character information, and the first character information is displayed from a first display position determined based on the first input information, wherein
if the second input information is not obtained within a first period after the first speech information is obtained, the processor is configured to process the first speech information after the first period; or
if the second input information is obtained within a second period after the first speech information is obtained, the processor is configured to process the first speech information based upon obtaining the second input information, wherein the second period is shorter than the first period.

5. The electronic device of claim 4, wherein the processor is configured to generate an instruction in accordance with the logic boundary position and execute the instruction to process speech information obtained.

6. The electronic device of claim 5, wherein the processor is configured to:
generate a speech collection instruction in accordance with the logic boundary position; and
execute the speech collection instruction to determine that a speech collection function is enabled from the logic boundary position, so as to collect the first speech information.

* * * * *

UNITED STATES PATENT AND TRADEMARK OFFICE
CERTIFICATE OF CORRECTION

PATENT NO. : 10,699,712 B2
APPLICATION NO. : 14/638281
DATED : June 30, 2020
INVENTOR(S) : Haisheng Dai et al.

Page 1 of 1

It is certified that error appears in the above-identified patent and that said Letters Patent is hereby corrected as shown below:

In the Claims

In Column 18, Claim 1, Line 48, delete "by the electronic device, then the electronic" and insert in its place --, then processing--.

Signed and Sealed this
Fourth Day of August, 2020

Andrei Iancu
*Director of the United States Patent and Trademark Office*